United States Patent [19]

De Los Reyes et al.

[11] Patent Number: 5,624,146

[45] Date of Patent: Apr. 29, 1997

[54] DEVICE FOR USE IN PICKING UP METALLIC OBJECTS

[76] Inventors: Elmer De Los Reyes, 5295 Martin St., P.O. Box 136, Mira Loma, Calif. 91752; Robert R. Hernandez, Sr., 4080 Pedley Rd., SP 84, Riverside, Calif. 92509

[21] Appl. No.: 630,945

[22] Filed: Apr. 5, 1996

[51] Int. Cl.⁶ .................... B03C 1/00; B25J 15/06
[52] U.S. Cl. ........................... 294/65.5; 209/215
[58] Field of Search ............ 294/65.5; 15/105, 15/160; 209/215–217; 335/285, 291, 293, 296, 302, 306

[56] References Cited

U.S. PATENT DOCUMENTS

| | | | |
|---|---|---|---|
| 1,630,987 | 5/1927 | Turner | 209/215 |
| 1,745,970 | 2/1930 | Andrew | 209/217 X |
| 2,426,795 | 9/1947 | Sjostrom | 294/65.5 X |
| 2,654,480 | 10/1953 | Stem | 294/65.5 X |
| 2,693,279 | 11/1954 | Box et al. | 294/65.5 X |
| 2,970,003 | 1/1961 | Heath et al. | 294/65.5 |
| 3,014,586 | 12/1961 | Ross | 294/65.5 X |
| 4,407,038 | 10/1983 | Haase | 294/65.5 X |

*Primary Examiner*—Johnny D. Cherry

[57] ABSTRACT

The present invention relates to a device for use in picking up metallic objects. More specifically, the present invention includes a frame having an upper extent and a lower extent with a handle bar positioned at the upper extent and a pair of wheels rotatably positioned at the lower extent. A magnetic head housing is slidably positioned at the lower extent of the frame. This housing includes an opening with a plurality of circular magnetic elements disposed therein. Furthermore, the present invention includes adjustment means for use in the positioning of the magnetic head housing relative to the ground.

5 Claims, 3 Drawing Sheets

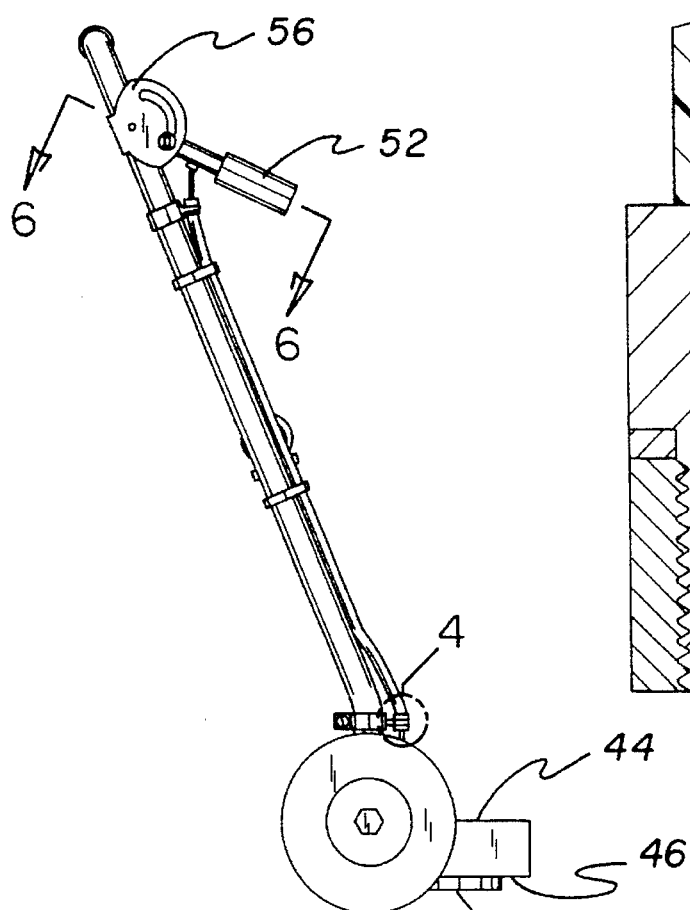
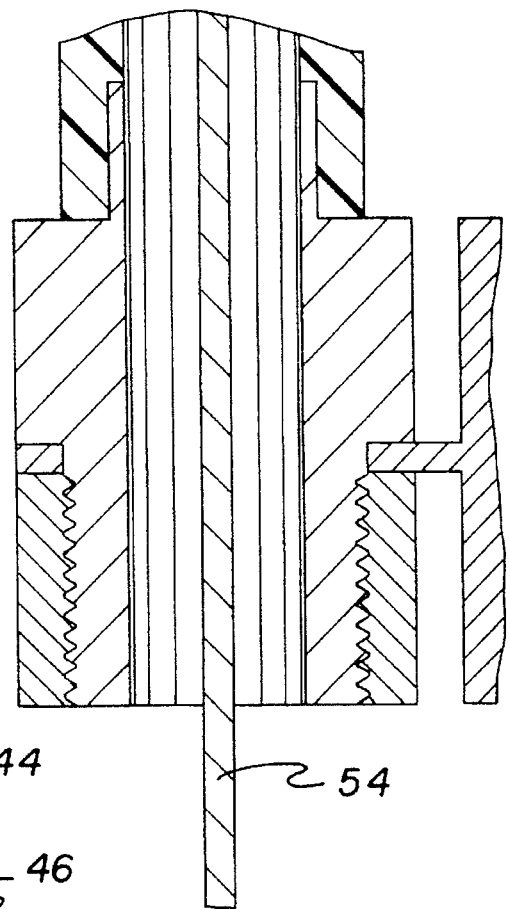
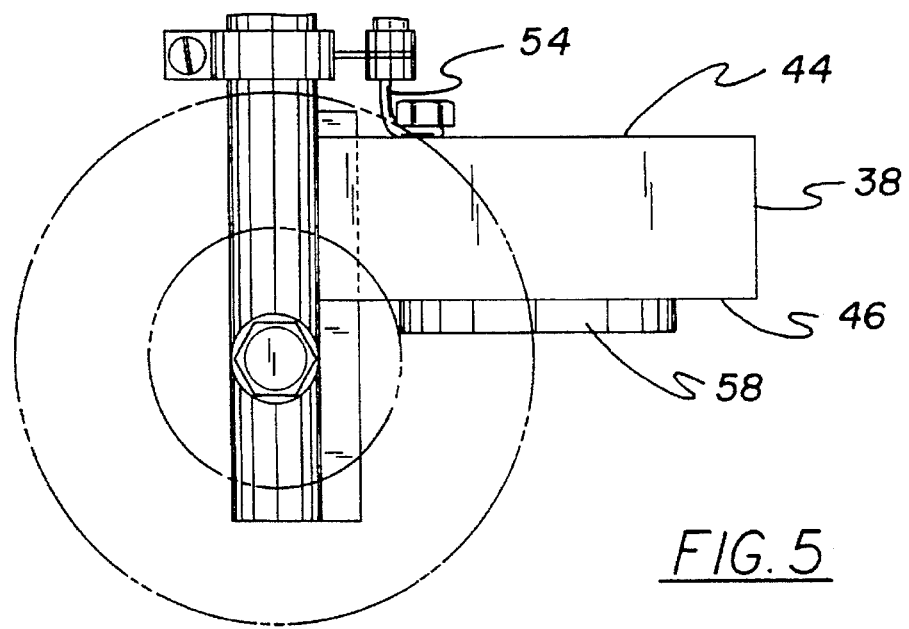
FIG. 3
FIG. 4
FIG. 5

DEVICE FOR USE IN PICKING UP METALLIC OBJECTS

BACKGROUND OF THE INVENTION

1. Field of the Invention

The present invention relates to a device for use in picking up metallic objects and more particularly pertains to a device which enables a user to easily pick up metallic objects from the ground.

2. Description of the Prior Art

The use of magnets is known in the prior art. More specifically, magnets heretofore devised and utilized for the purpose of picking up metallic objects are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,646,492 to Westermann; U.S. Pat. No. 5,265,887 to Stelmach; Des. U.S. Pat. No. 331,380 to Craddock; U.S. Pat. No. 4,172,597 to Smith et al.; U.S. Pat. No. 4,300,276 to Hill; U.S. Pat. No. 4,464,125 to Lierl all disclose various magnetic pick-up tools.

In this respect, the device for use in picking up metallic objects according to the present invention substantially departs from the conventional concepts and designs of the prior art, and in doing so provides an apparatus primarily developed for the purpose of a device which enables a user to easily pick up metallic objects from the ground.

Therefore, it can be appreciated that there exists a continuing need for new and improved device for use in picking up metallic objects which can be used for a device which enables a user to easily pick up metallic objects from the ground. In this regard, the present invention substantially fulfills this need.

SUMMARY OF THE INVENTION

In view of the foregoing disadvantages inherent in the known types of magnets now present in the prior art, the present invention provides an improved device for use in picking up metallic objects. As such, the general purpose of the present invention, which will be described subsequently in greater detail, is to provide a new and improved device for use in picking up metallic objects and a method which has all the advantages of the prior art and none of the disadvantages.

To attain this, the present invention essentially comprises an H-shaped frame having a lower extent and an upper extent with an intermediate extent therebetween. The frame includes a transverse support element positioned spanning the intermediate extent of the frame. Furthermore, a transverse handle bar spans the upper extent of the frame and a first and second wheel are rotatably positioned upon the lower extent of the frame. A magnetic housing, which has a forward extent, a rearward extent, an upper surface and a lower surface, is positioned at the lower extent of the frame. An opening is positioned within the lower surface of the magnetic head housing and the opening defines five generally circular portions. The rearward extent of the housing is slidably positioned upon the lower extent of the frame. A pivotal lever is positioned proximate the upper extent of the frame. A cable which has a first end, a second end and an intermediate extent therebetween, has its first end interconnected with the pivotal lever such that movement of the lever effects movement of the cable. The second end of the cable is secured to the upper surface of the housing with the intermediate extent of the cable positioned along the intermediate extent of the frame. Affixing means are associated with the pivotal lever. The affixing means functions to hold the pivotal lever at any one of a selected orientations. The pivotal lever, affixing means and cable together constitute an adjustment means with the pivotal movement of the lever effecting the slidable positioning of the housing relative to the frame and the affixing means keeping the pivotal lever in the selected orientation. Additionally, five circular magnetic elements are each positioned within one of the circular portions of the magnetic head housing.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved device for use in picking up metallic objects which have all the advantages of the prior art magnets and none of the disadvantages.

It is another object of the present invention to provide new and a improved device for use in picking up metallic objects which may be easily and efficiently manufactured and marketed.

It is further object of the present invention to provide a new and improved device for use in picking up metallic objects which are of durable and reliable constructions.

An even further object of the present invention is to provide a new and improved device for use in picking up metallic objects which are susceptible of a low cost of manufacture with regard to both materials and labor, and which accordingly are then susceptible of low prices of sale to the consuming public, thereby making such device for use in picking up metallic objects economically available to the buying public.

Still yet another object of the present invention is to provide a new and improved device for use in picking up metallic objects which provide in the apparatuses and methods of the prior art some of the advantages thereof, while simultaneously overcoming some of the disadvantages normally associated therewith.

Even still another object of the present invention is to a device which enables a user to easily pick up metallic objects from the ground.

Lastly, it is an object of the present invention to provide a new and improved device for use in picking up metallic objects. More specifically, the present invention includes a frame having an upper extent and a lower extent with a handle bar positioned at the upper extent and a pair of wheels rotatably positioned at the lower extent. A magnetic head housing is slidably positioned at the lower extent of the frame. This housing includes an opening with a plurality of circular magnetic elements disposed therein. Furthermore, the present invention includes adjustment means for use in the positioning of the magnetic head housing relative to the ground.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevational view of the device for use in picking up metallic objects.

FIG. 4 is an expanded view of the area indicated in FIG. 3.

FIG. 5 is a detailed view illustrating the interconnection between the cables and the upper surface of the magnetic head housing.

The same reference numerals refer to the same parts through the various Figures.

DESCRIPTION OF THE PREFERRED EMBODIMENT

Figure 1:
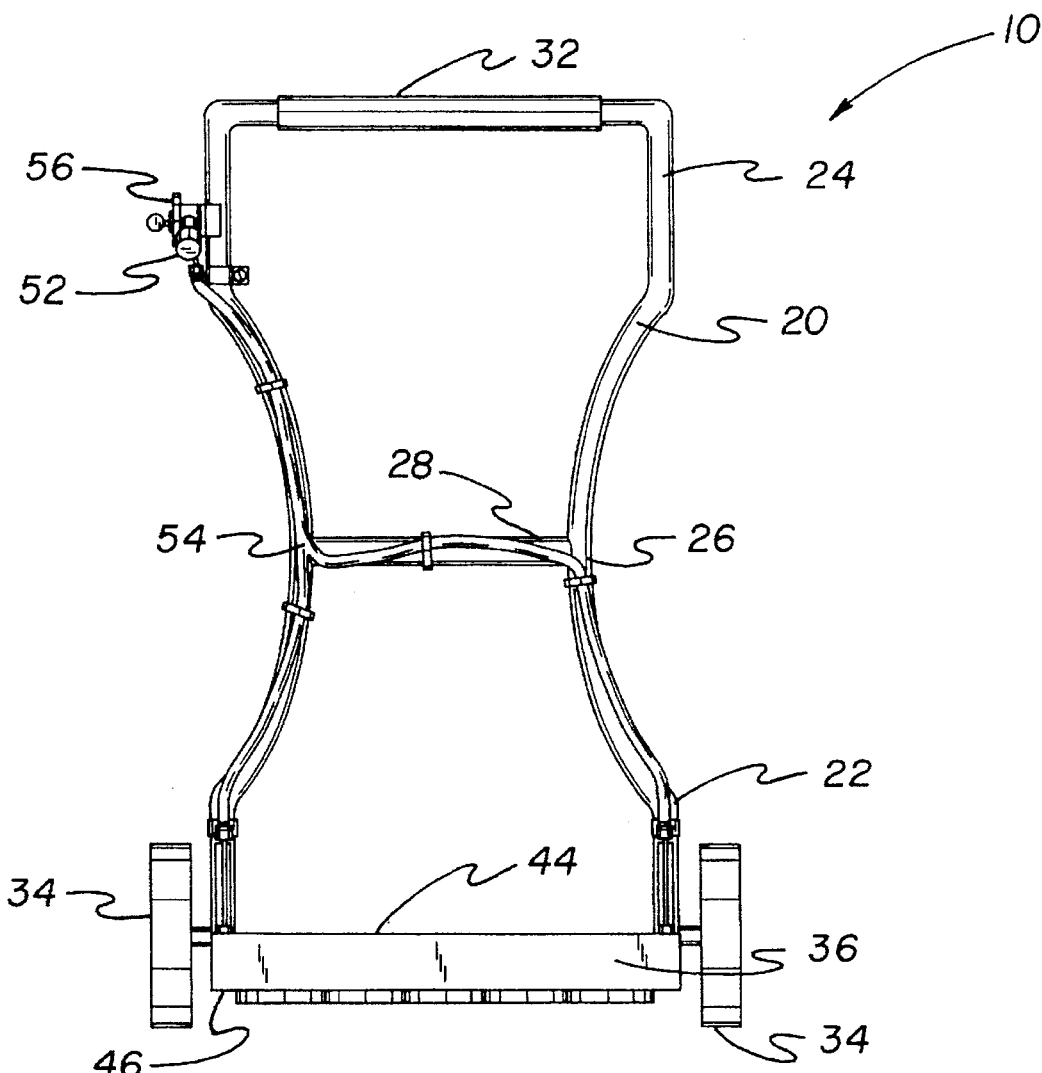
FIG. 1 is a perspective view of the preferred embodiment of the device for use in picking up metallic objects constructed in accordance with the principles of the present invention.
Figure 2:
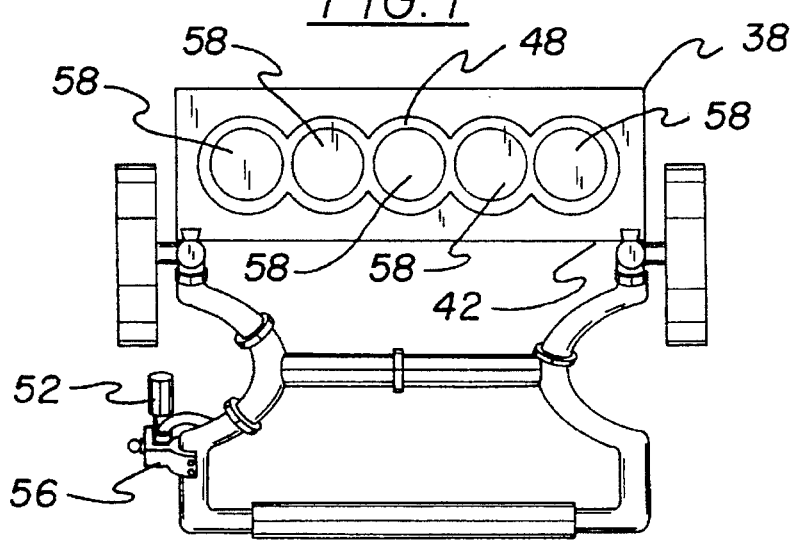
FIG. 2 is a plan view of the device for picking up metallic objects.
Figure 6:
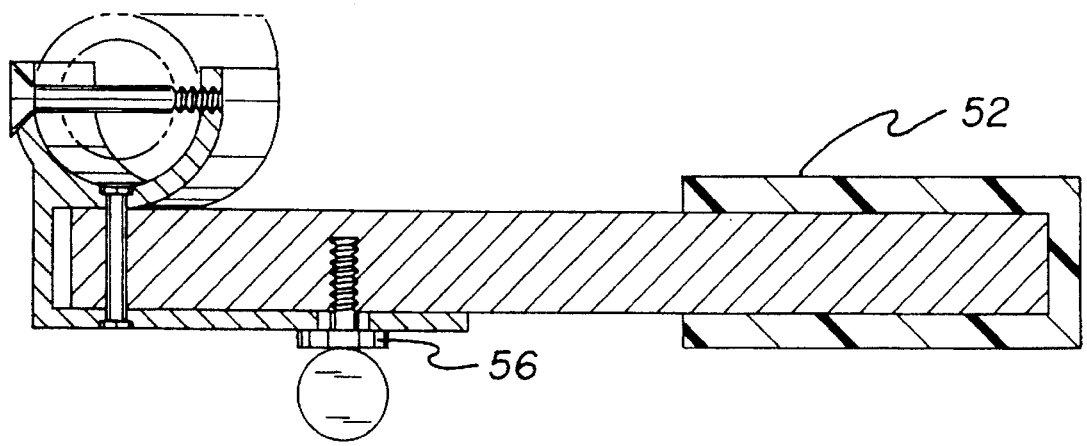
FIG. 6 is a view taken along line 6—6 of FIG. 3.
Figure 7:
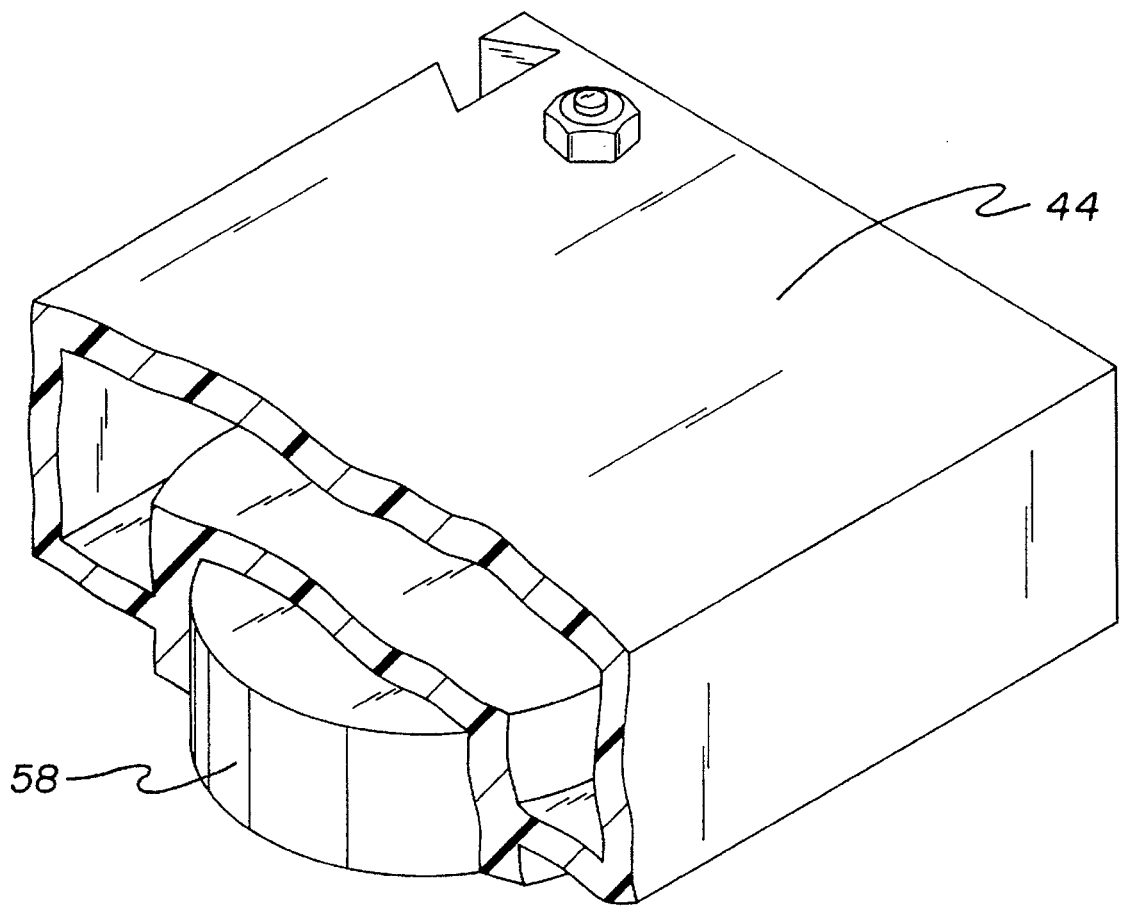
FIG. 7 is a sectional view of the magnetic head housing showing one of the circular magnetic elements.

With reference now to the drawings, and in particular to FIG. 1 thereof, the preferred embodiment of the new and improved device for use in picking up metallic objects embodying the principles and concepts of the present invention and generally designated by the reference numeral 10 will be described.

The present invention relates to a device 10 which is used in picking up various metallic objects from the ground. In its broadest context, the present invention includes a frame with a set of wheels at its lower extent and a handle bar at its upper extent. A housing is positioned at the lower extent of the frame and within the housing are positioned a plurality of magnetic elements. Thus, a user only needs to roll the device over a surface in order to collect various magnetic objects therefrom. Details as to various components of the present invention, and the manner in which they interrelate, will be described in greater detail hereinafter.

The major component of the present invention is the frame. In a preferred embodiment, the frame is H-shaped and is tubular in cross section. The H-shaped frame 20 is defined by a lower extent 22 and an upper extent 24 with an intermediate extent 26 therebetween. In order to provide greater rigidity to the overall frame, a transverse support element 28 is positioned spanning the intermediate extent 26 of the frame 20. The transverse support element 28 can best be seen in FIG. 1. In order for a user to propel the frame 20, a transverse handle bar 32 spans the upper extent 24 of the frame 20. This handle bar can include an elastic or deformable grip for use in providing a more comfortable surface by which the operator can control the device. Mobility is provided the device by a first and a second wheel 34 both of which are rotatably positioned upon the lower extent 22 of the frame 20. These wheels 34, with the first wheel being positioned upon the first side of the frame 20 and the second wheel being positioned upon the second side of the frame 20, can be constructed from plastic or rubber, or any other conventional wheel materials.

The next component of the invention is the magnetic head housing 36. This housing is defined by a forward extent 38, a rearward extent 42, an upper surface 44 and a lower surface 46. The housing 36 itself can be constructed from metal or plastic or any other suitable rigid material. An opening 48 is positioned within the lower surface 46 of the housing 36. In the preferred embodiment, the opening 48 defines five generally circular portions with the edges of adjacent portions being interconnected. The function of these circular portions will be described in greater detail hereinafter. The rearward extent 42 of the housing 36 is slidably positioned upon the lower extents 22 of the frame 20. This slidable interconnection between the housing 36 and frame 20 can be achieved in a number of different ways. However, in the preferred embodiment, the rearward extent 38 of the housing 36 includes two duct-tailed slots. These slots are positioned at opposite ends of the rearward extent 42 of the housing 36. These duct-tailed slots are adapted to cooperate with a set of rails which are positioned upon the lower extent 22 of the H-shaped frame 20. Thus, with the rails positioned within the duct-tailed slot of the housing 36, the housing is able to slide relative to the frame 20.

The means whereby the housing 36 may be positioned relative to the frame 20 will next be described. A pivotal lever 52 is positioned approximate the upper extent 24 of the frame 20. Furthermore, a cable 54 which is defined by a first end and a second end with an intermediate extent therebetween has its first end interconnected with the pivotal lever 52. As such, the movement of the lever 52 effects the movement of the cable 54. The second end of the cable 54 is secured to the upper surface 44 of the housing 36 with the intermediate extent of the cable being positioned along the intermediate extent 26 of the frame 20. The interconnection between the second end of the cable 54 and the upper surface 44 of the housing 36 can be achieved in a variety of ways. However, in the preferred embodiment depicted in FIG. 5, the second end of the cable is secured to the housing by way of a screw. Affixing means 56 are associated with the pivotal lever 52. The affixing means 56 functions to pull the pivotal lever at any one of a selected orientations. In a preferred embodiment the affixing means 56 takes the form of a plate having an arcuate slot formed therein. Within this slot rides a screw which is positioned within the pivotal lever 52. As such, affixing the screw at a point along the path of the arcuate slot affixes the lever 52 at a desired orientation. The pivotal lever 52, affixing means 56, and cable 54 together constitute adjustment means. The adjustment means functions such that the pivotal movement of the lever 52 effects the slidable position of the housing 36 relative to the frame 20 with the affixing means 56 keeping the pivotal lever 52 in a selected orientation. Thus, if a user wishes to vary the height at which the housing is disposed above a surface, he only needs to bring the pivotal lever 52 to a desired orientation and affix it there by way of the affixing means 56.

In order for the device of the present invention to pick up metallic objects, a number of circular magnetic elements 58 are positioned within the opening 48 of the magnetic head housing 36. The securement of the magnetic elements 58 within the housing 36 can be achieved in any number of ways, such as screws or adhesives. In the preferred embodiment, the five circular magnetic elements 58 are secured within the opening 48.

Thus, in operation, a user first determines the optimum distance above the work surface to position the magnetic head housing. The housing then can be positioned relative to the work surface by way of the adjustment means. Once this is achieved, the operator then procedes to push the device over the work surface and thus collect any metallic objects positioned thereon by way of the magnetic elements positioned within the housing. The device can then be stopped, the housing can then be raised by way of the adjustment means and any metallic objects secured to the magnetic elements can be manually removed. It is within the scope of the present invention to use the circular magnetic elements in their opposite sense. Namely, securing the magnetic elements within the housing such that they present a repellant force to any metallic objects. As such, the device can be used for clearing a path or repelling any magnetic objects or metallic objects away from the device. However, the preferred embodiment is using the device to collect magnetic objects.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A device for use in picking up metallic objects, the device comprising, in combination:

an H-shaped frame having a lower extent and an upper extent with an intermediate extent therebetween, a transverse support element positioned spanning the intermediate extent of the frame, a transverse handle bar spanning the upper extent of the frame, a first and a second wheel rotatably positioned upon the lower extent of the frame;

a magnetic head housing having a forward extent and a rearward extent, an upper surface and a lower surface, an opening positioned within the lower surface, the opening defining five generally circular portions, the rearward extent of the housing being slidably positioned upon the lower extent of the frame;

a pivotal lever positioned proximate the upper extent of the frame, a cable having a first end, a second end and an intermediate extent therebetween, the first end of the cable being interconnected with the pivotal lever such that movement of the lever effects movement of the cable, the second end of the cable secured to the upper surface of the housing, the intermediate extent of the cable positioned along the intermediate extent of the frame, an affixing means associated with the pivotal lever, the affixing means holding the pivotal lever at a select orientation, the pivotal lever, affixing means, and cable together constituting adjustment means with the pivotal movement of the lever effecting the slidable positioning of the housing relative to the frame and the affixing means keeping the pivotal lever in a selected orientation; and five circular magnetic elements, each of the magnetic elements being positioned within one of the circular portions of the magnetic head housing.

2. A device for picking up metallic objects, the device comprising:

a frame having a lower extent and an upper extent with an intermediate extent therebetween, a first and a second wheel rotatably positioned upon the lower extent of the frame;

a magnetic head housing having a forward extent and a rearward extent, an upper surface and a lower surface, an opening positioned within the lower surface, the opening defining a generally circular portion, the rearward extent of the housing being slidably positioned upon the lower extent of the frame;

a pivotal lever positioned proximate the upper extent of the frame, a cable having a first end, a second end and an intermediate extent therebetween, the first end of the cable being interconnected with the pivotal lever such that movement of the lever effects movement of the cable, the second end of the cable secured to the upper surface of the housing, the intermediate extent of the cable positioned along the intermediate extent of the frame, the pivotal lever, and cable together constituting adjustment means with the pivotal movement of the lever effecting the slidable positioning of the housing relative to the frame keeping the pivotal lever in a selected orientation; and a circular magnetic element, the magnetic element being positioned within the circular portion of the magnetic head housing.

3. The device as described in claim 2 wherein:

the frame is H-shaped, and includes a transverse support element positioned spanning the intermediate extent of the frame.

4. The device as described in claim 2 wherein:

the opening in the lower surface of the magnetic housing defines five generally circular portions; and wherein five circular magnetic elements are positioned within each of the circular portions of the magnetic head housing.

5. The device as described in claim 2 wherein:

the adjustment means further comprising an affixing means associated with the pivotal lever, the affixing means holding the pivotal lever at a selected orientation.

* * * * *